United States Patent [19]

Skaggs

[11] 4,267,989

[45] May 19, 1981

[54] TOY HOT AIR BALLOON

[76] Inventor: Kenneth D. Skaggs, 1805 Clement St., Alameda, Calif. 94604

[21] Appl. No.: 73,253

[22] Filed: Sep. 7, 1979

[51] Int. Cl.³ .................... B64B 1/40; A63H 27/10
[52] U.S. Cl. ........................................ 244/31; 46/87
[58] Field of Search ............................ 244/31-33, 244/125, 126, 127, 128, 98; 46/87, 89, 90

[56] References Cited

U.S. PATENT DOCUMENTS

| 193,599 | 7/1877 | Detwiller | 244/31 UX |
|---|---|---|---|
| 247,478 | 4/1881 | Brigham | 244/31 |
| 1,866,079 | 7/1932 | Blondin | 244/31 |
| 2,526,719 | 10/1950 | Winzen | 244/31 |
| 2,771,256 | 11/1956 | Ryan | 244/31 |
| 3,006,578 | 10/1961 | Rodset | 244/31 |
| 3,080,138 | 3/1963 | Church | 244/31 |
| 3,311,328 | 3/1967 | Slater | 244/31 |

FOREIGN PATENT DOCUMENTS 2360089 3/1978 France ................................ 244/31

OTHER PUBLICATIONS

Morse, *How to Make and Fly Model Hot–Air Balloons*, David McKay Co., Inc., New York, 1978.

*Primary Examiner*—Galen L. Barefoot
*Attorney, Agent, or Firm*—Bielen and Peterson

[57] ABSTRACT

A toy hot air balloon constructed of a plurality of elongated gores fashioned from light-weight, thin material. Each of the gores has an opposed pair of long and short edge portions. The gores are sealed in side-by-side configuration at the long edge portions to form an enclosure having a top portion and bottom portion. The bottom portion includes an opening for the admission of hot air. The balloon further includes a mouth area which is reinforced and possesses a higher stiffness than the remaining portion of the enclosure. Each of the ends of the gores are fastened to the mouth of the enclosure. A support permits the suspension of the toy hot air balloon while filling the same with hot air.

6 Claims, 6 Drawing Figures

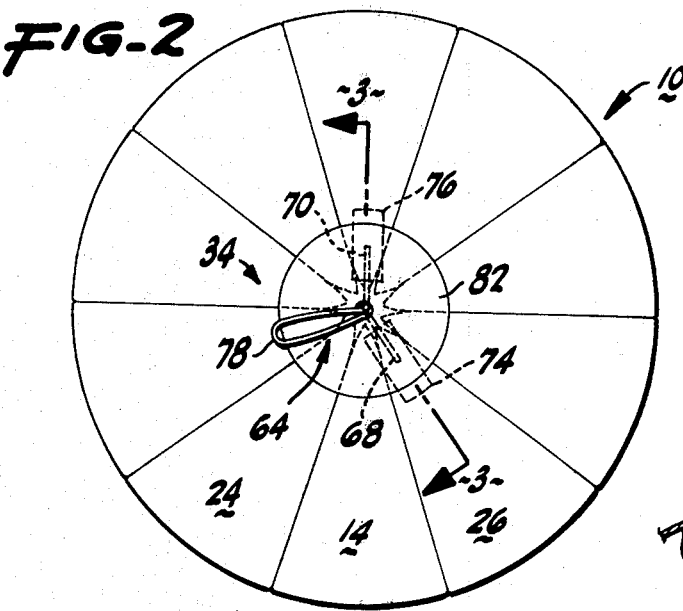
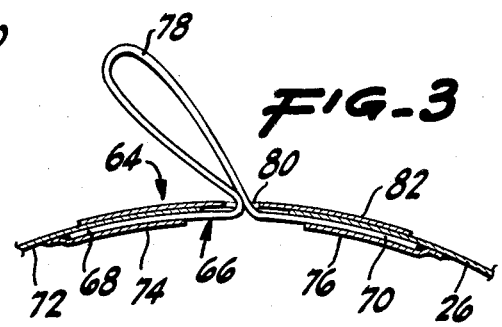
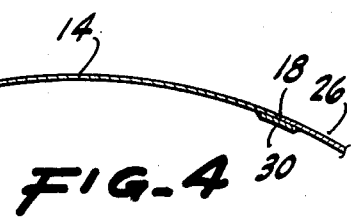
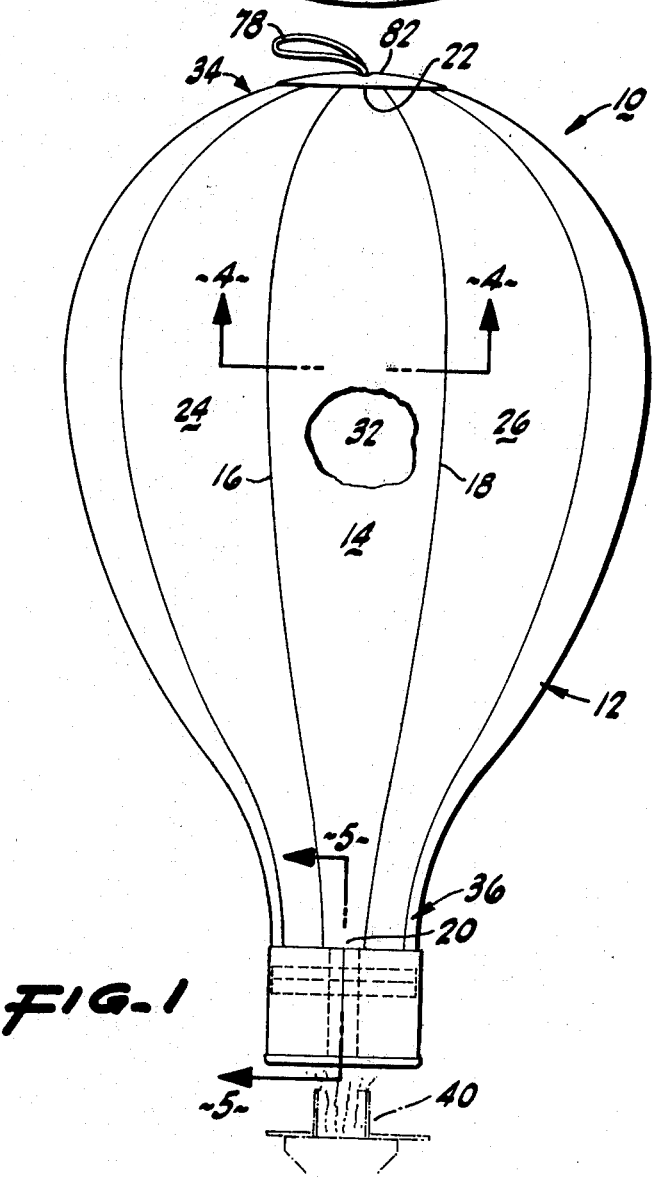
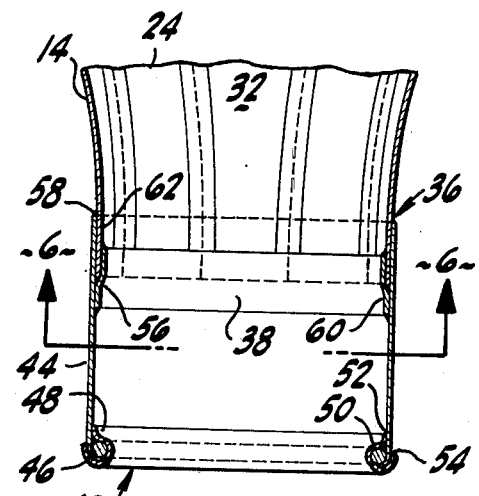
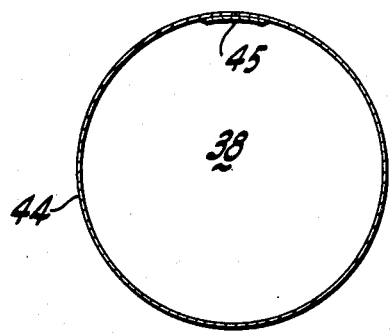

TOY HOT AIR BALLOON

BACKGROUND OF THE INVENTION

The present invention relates to a novel toy hot air balloon.

Hot air balloons have been designed and flown since the 18th century. Modern day hot air balloons have been flown great distances carrying crews of several persons to regulate and control the same. Although such flights have excited the imagination of many persons, relatively few people ever have the opportunity to actually take a flight in a hot air balloon.

Although many flying toys have been designed, a workable hot air balloon toy has eluded toy designers. There have been, of course, lighter than air balloons, ie: those filled with helium or hydrogen, but this type of balloon is usually sealed after inflation and requires minimal skill in the inflation thereof.

A hot air balloon toy which may be constructed from a kit and which is easily inflatable for the purposes of flight is needed.

SUMMARY OF THE INVENTION

In accordance with the present invention a novel and useful hot air balloon toy is provided. The toy of the present invention provides a plurality of elongated gores constructed of relatively light-weight, thin material. Each of the gores has a pair of long and a pair of short edge portions.

The device also includes means for fastening the elongated gores together in side-by-side configuration at the long edge portions to form an enclosure for holding the hot air. The enclosure includes a top portion and a bottom portion where the short edge portions of the gores meet. The bottom of the enclosure has an opening which is used for the admission of heated air into the enclosure.

The toy hot air balloon also embraces means for stiffening the bottom portion of the enclosure in the vicinity of the opening. This permits a person to hold open the enclosure while filling the same with hot air without any debilitating collapse of the enclosure and the opening thereto. The top portion of the enclosure includes means for supporting the same above the bottom portion which facilitates the flow of hot air into the enclosure and speeds the filling process. The short edge portions of the gores are sealed at the top portion of the enclosure near the means for supporting the same. The bottom short edge portion of the gores are fixed by means to the means for stiffening the bottom portion of the enclosure.

The means for stiffening may take the form of a sheet of lightweight thin material possessing a stiffness greater than the material used for the construction of the gores. Such a sheet substantially surrounds the bottom portion of the enclosure and may include a loop which adds rigidity and weight to the bottom portion thereof. The loop is attached to the sheet to prevent relative movement therebetween.

The gores of the toy hot air balloon may be attached by gluing or taped in side-by-side disposition at the long edge portions thereof. Likewise, a selected length tape may be employed as means of fixing the short edge portion of each of the gores to the bottom portion of the enclosure, ie: means for stiffening the bottom portion of the enclosure. Likewise, the balloon may also embrace means for attaching the loop to the sheet. For example, a sheath may serve this purpose by substantially enclosing the loop and connecting the same to the stiffening sheet of material.

The means for supporting the top portion may take the form of an elongated member such as a cord which has both ends fastened to the inner surface of the enclosure leaving an eye which passes through the enclosure to the exterior portion thereof. The eye serves as a means of purchase and may be manipulated in cooperation with a gaff for raising the enclosure above the ground surface during the filling process. Also, a cover may be employed to overlap the outer surface of the enclosure opposite to the attachment points of the elongated member on the inner surface of the enclosure. Such a cover would permit the eye to extend to the outer surface while adding strength to that area of the enclosure.

It may be apparent that a novel and useful toy hot air balloon has been described.

It is therefore an object of the present invention to provide a toy hot air balloon which may be safely and easily filled with hot air from a stationary source of heat.

It is another object of the present invention to provide a toy hot air balloon which may be easily constructed from components in kit form.

It is yet another object of the present invention to provide a toy hot air balloon which includes a mouth possessing a stiffness greater than the remaining portion of the toy hot air balloon which facilitates the filling process necessary for the inducement of flight.

It is still another object of the present invention to provide a toy hot air balloon which possesses a weighted bottom portion which has very little adverse effect on the flight characteristics of the hot air balloon.

The invention possesses other objects and advantages especially as concerns particular features and characteristics thereof, which will become apparent as the specification continues.

BRIEF DESCRIPTION OF THE DRAWINGS

FIG. 1 is a side elevational view of the device of the present invention being filled with hot air.

FIG. 2 is a top plan view of the present invention in an inflated condition.

FIG. 3 is a sectional view taken along line 3—3 of FIG. 2.

FIG. 4 is a sectional view taken along line 4—4 of FIG. 1.

FIG. 5 is a sectional view taken along line 5—5 of FIG. 1.

FIG. 6 is a sectional view taken along line 6—6 of FIG. 5.

For a better understanding of the invention, reference is made to the following detailed description.

DESCRIPTION OF THE PREFERRED EMBODIMENTS

Various aspects of the present invention will evolve from the following detailed description of the preferred embodiments thereof which should be taken in conjunction with the heretofore described drawings.

The invention as a whole is depicted on the drawings by reference character 10 and includes as one of its elements a plurality of gores 12 of elongated configuration and constructed of relatively light-weight, thin material, such as mylar, tissue paper and like materials.

Each gore, such as gore 14, includes an opposed pair of long edge portions 16 and 18 and a pair of opposed short edge portions 20 and 22. Each of the plurality of gores 12 are normally identically shaped, but may be a symmetrically shaped to provide a particular form to the toy balloon 10.

Means 22 fastens the elongated gores 12 together in side-by-side configuration at the long edge portions thereof. FIG. 4 illustrates one method of fastening where adhesive tapes 28 and 30 are bind gores 24 and 14 and gores 26 and 14 together at the long edge portions 16 and 18 of gore 14. Other methods may be employed such as glue, fusion, (mylar), and the like to interconnect the long edge portions of the plurality of gores 12. Thus, an enclosure 32, FIG. 1, is formed by the interconnection of the plurality of gores 12. Enclosure 32 generally has a top portion 34 and a bottom portion 36. Bottom portion 36 includes an opening or mouth 38 which admits air to the interior of enclosure 32. As may be seen in FIG. 1, a source of heat 40 which may be a charcoal stove, a porch, and the like, produces heated air. Source of heat 40 may be a stationary source since balloon 10 is easily movable by one or two persons.

The balloon also embraces means 42 for stiffening bottom portion 36 of enclosure 32 adjacent mouth 38. Means 42 may take the embodiment shown in FIG. 5 wherein a sheet 44 substantially surrounds bottom portion 36 of enclosure 32. Sheet 44 is a light-weight, thin material which possesses a stiffness greater than the material used to construct the plurality of gores 12. For example, sheet 44 may be of craft paper, plastic, balsa wood, and the like. A loop 46 lies adjacent sheet 44 and possesses a rigidity greater than the same. For example, loop 46 may be constructed of steel, copper, heavy wood, and the like. Loop tends to hold open the mouth 38 and ballasts the balloon 10 during flight. Means 48 attaches loop 46 to sheet 44. Such means may take the form of a sheath 50 which surrounds loop 46 and attaches to either side to sheet 44 at annular areas 52 and 54. It should be noted that sheet 44 and loop 46 may be formed of material denser than that used to construct plurality of gores 12. Thus, balloon 10 maintains relative stability during flight since loop 46 and sheet 44 serve to weight bottom portion 36.

The invention also includes as one of its elements means 56 for fixing one short edge portion of each of the plurality of gores 12 to sheet 44. Gore 14 includes a short edge portion 58 which overlaps sheet 44. Means for a selected length of tape 60 adheres to the inside of sheet 44 and to the inner side 62 of short edge portion 58 of gore 14. The tape 60 connects each adjacent short edge portion of the plurality of gores terminating at bottom portion 36 of enclosure 32. FIG. 6 illustrates the enclosing of sheet 44 with adhesive tape 45 in the vertical direction.

With reference to FIGS. 2 and 3, it may be seen that balloon 10 includes means 64 for supporting top portion 34 above bottom portion 36 during the filling of enclosure 32 with hot air produced by heat source 40. Means 64 is shown in FIG. 3 as an elongated member possessing some flexibility, such as the nylon or cotton cord. Elongated member 66 has end portions 68 and 70 which are fastened to the inner surface 72 by adhesive tape portions 74 and 76. Thus, an eye 78 is formed which extends through an opening 80 of enclosure 32 to the outside thereof. A cover 82 which may be glued to the short end portions of plurality of gores 12 at the top portion 34 of enclosure 32. Cover 82 also permits eye 78 to extend outwardly therefrom such that eye 78 may be held by the hand of the user, an extension pole, a line, and the like during the filling process of enclosure 32.

In operation, the user holds sheet 44 over heat source 40 such that hot air enters enclosure 32 via mouth 38. Eye 78 is grasped and tensioned such that enclosure 32 extends upwardly permitting the air to easily inflate enclosure 32. After inflation of balloon 10, eye 78 and sheet 44 are released to permit balloon 10 to fly. It has been found that an embodiment of balloon approximately five feet in height when inflated will raise several hundred feet and stay aloft for several minutes.

While in the foregoing specification embodiments of the invention have been set forth in considerable details for the purposes of making a complete disclosure of the invention, it will be apparent to those of ordinary skill in the art that numerous changes may be made in such details without departing from the spirit and principles of the invention.

What is claimed is:

1. A toy hot air balloon comprising:
    a. a plurality of elongated gores constructed of relatively light-weight, thin material; said gores having opposed pairs of long and short edge portions;
    b. means for fastening said elongated gores together in side-by-side configuration at said long edge portions to form an enclosure having a top portion and a bottom portion, said bottom portion of said enclosure including an opening for the admission of heated air into said enclosure;
    c. means for stiffening said bottom portion of said enclosure adjacent said opening;
    d. means for supporting the top portion of said enclosure above said bottom portion of said enclosure; said means for supporting the top of said enclosure adjacent said opening comprising:
        an elongated member fastened at both ends to the inner surface of said enclosure forming an eye which passes from the inside to the outside of said enclosure and a tape portion generally overlapping the inner surface of said enclosure over said attachment of said ends of said elongated member to the inner surface of said enclosure, a cover being fastened to said outer surface of said enclosure, and
    e. means for fixing one short edge portion of each of said gores to said means for stiffening said bottom portion of said enclosure.

2. The toy hot air balloon of claim 1 in which said means for stiffening said bottom portion of said enclosure comprises:
    a. a sheet of light-weight, thin material possessing a stiffness greater than said material for said gores, said sheet being substantially adjacent said bottom portion of said enclosure;
    b. a loop being in substantially adjacent relationship to said sheet, said loop being constructed of material possessing a rigidity greater than said sheet; and
    c. means for attaching said loop to said sheet.

3. The toy hot air balloon of claim 2 in which said means for fixing one short edge portion of each of said gores to said means for stiffening said bottom portion comprises a selected length of tape adhering to said short edge portions of each of said gores and said sheet.

4. The toy hot air balloon of claim 3 in which said means for attaching said loop to said sheet comprises a sheath surrounding said loop and attaching to said sheet.

5. The toy hot air balloon of claim 4 in which said cover includes means for fastening another short edge portion of each of said gores in adjacent disposition at the top portion of said enclosure.

6. The toy hot air balloon of claim 4 in which said sheet and said loop are constructed of material denser than said gore material.

* * * * *